US012771595B2

(12) United States Patent
Szabo

(10) Patent No.: US 12,771,595 B2
(45) Date of Patent: Oct. 20, 2026

(54) COMMUNICATION SYSTEM

(71) Applicant: Frequentis AG, Vienna (AT)

(72) Inventor: Ernst Szabo, Vienna (AT)

(73) Assignee: Frequentis AG, Vienna (AU)

( * ) Notice: Subject to any disclaimer, the term of this patent is extended or adjusted under 35 U.S.C. 154(b) by 224 days.

(21) Appl. No.: 18/786,834

(22) Filed: Jul. 29, 2024

(65) Prior Publication Data

US 2025/0039038 A1 Jan. 30, 2025

(30) Foreign Application Priority Data

Jul. 28, 2023 (AT) .............................. A 50609/2023

(51) Int. Cl.
*H04L 41/0654* (2022.01)
*H04L 41/00* (2022.01)

(52) U.S. Cl.
CPC .......... *H04L 41/0654* (2013.01); *H04L 41/32* (2013.01)

(58) Field of Classification Search
None
See application file for complete search history.

(56) References Cited

U.S. PATENT DOCUMENTS

2013/0027509 A1* 1/2013 Ranganath .......... G06F 11/2033 348/E7.083

FOREIGN PATENT DOCUMENTS

JP 2013126164 A 6/2013

* cited by examiner

*Primary Examiner* — Edemio Navas, Jr.
(74) *Attorney, Agent, or Firm* — Laurence A. Greenberg; Werner H. Stemer; Ralph E. Locher

(57) ABSTRACT

A communication system and method for transmitting signals between two or more subscriber units via at least a first transmission chain and a second transmission chain. Each subscriber unit is connected to a subscriber-attributed processing unit of the first transmission chain and to a subscriber-attributed processing unit of the second transmission chain. At least one subscriber-attributed processing unit and/or at least one additional processing unit of the first transmission chain and at least one subscriber-attributed processing unit and/or at least one additional processing unit of the second transmission chain are connected to one another via at least one wideband transmission interlink.

16 Claims, 7 Drawing Sheets

COMMUNICATION SYSTEM

CROSS-REFERENCE TO RELATED APPLICATION

This application claims the priority, under 35 U.S.C. § 119, of Austrian Patent Application A50609/2023, filed Jul. 28, 2023; the prior application is herewith incorporated by reference in its entirety.

FIELD AND BACKGROUND OF THE INVENTION

The invention relates to a communication system and a method for transmitting audio signals and possibly other signals such as PTT and SQU signals between two or more subscriber units via at least a first transmission chain and a second transmission chain as described in the claims.

The prior art discloses communication systems in which the transmission of audio signals and associated signalling (e.g. PTT (Push To Talk) and SQU (squelch) signals) between two or more communication subscribers, regardless of whether radio or telephone conversations are involved, is realized by a multistage transmission chain between the individual communication partners, this transmission chain consisting of multiple processing units and corresponding connections. In practical implementations, the audio signals from multiple subscribers can be transmitted via the individual processing units and e.g. a wideband transmission medium (e.g. PCM highways or Gigabit Ethernet) to the other processing units.

In order to increase the availability of the transmission of audio signals and the functions of a communication system, (multiple) redundant transmission chains can be realized in order to prevent errors in one transmission chain from affecting the function or the transmission of audio signals in the communication system. Redundantly designed communication systems therefore have two or more transmission chains in which the audio signals are simultaneously transmitted and processed. In redundantly designed communication systems, the audio signal that is output by the receiving subscriber needs to be selected from multiple processing units of the redundant transmission chains.

If an error occurs in one processing unit or a connection between a processing unit and a subscriber unit is faulty, redundant transmission chains such as these require a decision to be made as to which audio signal is meant to be output to the user.

In known communication systems, the decision as to which of the audio signals of the redundant transmission chains is used as the output signal from a subscriber unit is made autonomously in each receiving subscriber unit, and the switch between the transmission chains is made at the receiving subscriber units. This requires the error states of all components of all of the transmission chains and the associated connections to be known to the receiving subscriber unit.

A disadvantage of this known implementation is initially that the transmission of error states may be problematic, as the connections between the subscriber units and the transmission units are usually made with lower bandwidth and all error states from the whole transmission chain need to be transmitted to the receiving subscriber units.

Furthermore, each receiving subscriber unit makes a standalone decision in order to select the audio signal of one transmission chain. This also means that the time of the decision and therefore the time of the switch may be slightly different for each subscriber unit. As a result, the duration of any loss of the audio signal for different subscriber units is also subject to a certain variance.

In order to be able to keep the time for which the audio output signal is lost for a receiving subscriber unit in the event of an error state in the transmission chain as short as possible, there is a need for a fast transmission mechanism for the error information, or status information, between all components of a transmission chain.

If there are multiple, different error states in the redundant audio transmission chains, it may sometimes not be possible to compensate for all of the error states in this arrangement merely by way of a switch.

In communication systems having an extra processing unit e.g. for the computation of audio conferences with multiple participants, the conference units may deliver different conference signals if there are different errors in the redundant transmission chains. This means that a switch from the audio signal of one transmission chain to the audio signal of the other transmission chain in a subscriber unit can result in other participants being absent from the conference signal.

SUMMARY OF THE INVENTION

It is therefore the object of the invention to provide a remedy in this regard and to deliver a communication system and a method for transmitting audio signals that overcome the aforementioned disadvantages.

The object is achieved by a communication system for transmitting audio signals and possibly other signals such as Push-To-Talk (PTT) and/or squelch (SQU) signals between two or more subscriber units via at least a first transmission chain and a second transmission chain, wherein:

- each subscriber unit can be used to input audio signals and possibly other signals, in particular PTT and SQU signals, to be transmitted and to output received audio signals,
- each transmission chain comprises at least one subscriber-attributed processing unit and possibly at least one additional processing unit in each case,
- each subscriber-attributed processing unit is connected to at least one subscriber unit in each case,
- each subscriber unit is connected to a subscriber-attributed processing unit of the first transmission chain and to a subscriber-attributed processing unit of the second transmission chain,
- the subscriber-attributed processing units of a respective transmission chain are connected to one another via a wideband transmission path and/or to an additional processing unit of the respective transmission chain, as claimed in patent claim 1.

The invention provides for:

- at least one subscriber-attributed processing unit and/or at least one additional processing unit of the first transmission chain and at least one subscriber-attributed processing unit and/or at least one additional processing unit of the second transmission chain to be connected to one another via at least one wideband transmission interlink,
- the wideband transmission interlink being able to be used to forward audio signals and possibly other signals from the first transmission chain to the second transmission chain and/or from the second transmission chain to the first transmission chain, and
- this at least one subscriber-attributed processing unit, having a wideband transmission interlink, and/or this at least one additional processing unit, having a wideband transmission interlink, of each of the transmission chains to each comprise the following:

a switching unit, the switching unit, in each case,
 being connected to the wideband transmission path of the respective transmission chain and to the at least one wideband transmission interlink and
 being designed to switch between the wideband transmission path of the respective transmission chain and the wideband transmission interlink for transmitting, in particular individual, audio signals and possibly other signals from the respective other transmission chain, an error detection unit connected to the switching unit, the error detection unit of the first transmission chain being designed
 to check whether audio signals and possibly other signals, in particular PTT and SQU signals, input on a subscriber unit are transmitted via the wideband transmission path of the first transmission chain, and
 if the input audio signals and possibly other signals fail to be transmitted via the wideband transmission path of the first transmission chain, to trigger the switching unit to switch from the wideband transmission path of the first transmission chain to the wideband transmission interlink for transmitting, in particular individual, audio signals and possibly other signals from the second transmission chain, and the error detection unit of the second transmission chain being designed to
 check whether audio signals and possibly other signals, in particular PTT and SQU signals, input on a subscriber unit are transmitted via the wideband transmission path of the second transmission chain, and
 if the input audio signals and possibly other signals fail to be transmitted via the wideband transmission path of the second transmission chain, to trigger the switching unit to switch from the wideband transmission path of the second transmission chain to the wideband transmission interlink for transmitting, in particular individual, audio signals and possibly other signals from the first transmission chain, and an audio processing unit, the audio processing unit being connected downstream of the switching unit, with the result that the audio processing unit can be supplied with the audio signals selected by the switching unit.

In a communication system according to the invention, audio signals can advantageously be exchanged between the redundant transmission chains, meaning that audio signals that are absent from one transmission chain can be replaced by the audio signals of the respective other transmission chain.

The invention includes at least one subscriber-attributed processing unit of each transmission chain, or at least one additional processing unit of a transmission chain, if present, to be connected to one or more (other) subscriber-attributed processing units of a transmission chain via a wideband transmission path and to have a wideband transmission interlink to a different transmission chain, a switching unit, an error detection unit and an audio processing unit. Otherwise, the relevant subscriber-attributed or additional processing unit can be of any design, may be connected to subscriber units or can have no connection to a subscriber unit.

If an error detection unit of the subscriber-attributed or additional processing unit of a transmission chain discovers that errors in the transmission chain mean that audio signals are absent, these errors can be compensated for by using the audio signals of the respective other transmission chain. This is advantageously done automatically and without any action by the subscribers, or the subscriber units to which the subscribers are connected.

For this, the invention provides for extra connections in the form of at least one wideband transmission interlink, e.g. PCM highway, between at least one subscriber-attributed or possibly at least one additional processing unit or the switching units of the respective subscriber-attributed or possibly additional processing unit. This extra connection can be used to transmit the absent audio signals of the wideband transmission path, e.g. PCM highway, of the respective other transmission chain.

A transmission chain is understood within the context of the invention to mean all of the elements of a communication system that handle the transmission and processing of audio signals between the transmitting subscriber and the receiving subscriber. A redundantly designed communication system according to the invention therefore has two or more transmission chains in which the audio signals are simultaneously transmitted and processed.

A processing unit is understood within the context of the invention to mean an element of a transmission chain that firstly receives the audio signals from the subscriber units and transmits said audio signals to said subscriber units and that is secondly connected to a wideband transmission path (e.g. PCM highway). The connection to the wideband transmission path can be made with high bandwidth, while the connection to the subscriber units can be made with low bandwidth. The processing unit also comprises an audio processing unit for processing the transmitted audio signals.

An audio processing unit is understood within this context to mean a unit that processes the transmitted audio signals for the purposes of the function of the communication system (e.g. computation of audio conferences) and makes them available for distribution to other processing units.

A subscriber unit is understood within the context of the invention to mean an element of a transmission chain that transmits the (audio) signals input by a subscriber to the (redundant) processing units, or receives said signals from said processing units. A subscriber is understood to mean a user of the communication system.

A wideband transmission path, or a wideband transmission interlink, is understood within the context of the invention to mean a wideband transmission medium (e.g. PCM highway or Gigabit Ethernet) that can be used to transmit a multiplicity of signals (audio signals and the signalling thereof) to processing units. A PCM highway is understood within the context of the invention to mean a transmission medium for simultaneously transmitting many different audio signals, the samples of which are defined in accordance with pulse code modulation (e.g. in accordance with ITU standard G.703).

The invention furthermore achieves the aforementioned object by means of a method according to the invention for transmitting audio signals and possibly other signals, in particular PTT and/or SQU signals, between two or more subscriber units via at least a first transmission chain and a second transmission chain, in particular using a communication system according to the invention as claimed in patent claim 8.

In this case, the invention provides for:

each subscriber unit to be able to be used to input audio signals and possibly other signals, in particular PTT and SQU signals, to be transmitted to at least one other subscriber unit and to output audio signals received from the at least one other subscriber unit;

audio signals within a respective transmission chain to be able to be transmitted via a wideband transmission path, in particular via a PCM highway in each case; and audio signals to be able to be transmitted between the first transmission chain and the second transmission chain via at least one wideband transmission interlink; and the following method steps:

inputting audio signals and possibly other signals on a subscriber unit for transmission via the first transmission chain and via the second transmission chain, transmitting audio signals and possibly other signals input on the subscriber unit to at least one other subscriber unit via the first transmission chain, checking whether the audio signals and possibly other signals input on the subscriber unit are transmitted via the wideband transmission path of the first transmission chain, and if the input audio signals and possibly other signals fail to be transmitted via the wideband transmission path of the first transmission chain, switching from the wideband transmission path of the first transmission chain to the wideband transmission interlink for transmitting audio signals and possibly other signals from the second transmission chain, and transmitting audio signals and possibly other signals from the second transmission chain.

Switching, if each individual input audio signal fails to be transmitted via a respective transmission chain, from the wideband transmission path of the relevant transmission chain to the wideband transmission interlink for transmitting audio signals from the respective other transmission chain, and transmitting audio signals from the respective other transmission chain, allows audio signals that are absent from one transmission chain to be quickly and reliably replaced by the audio signals of the respective other transmission chain.

Other advantageous variant embodiments of a communication system according to the invention and a method according to the invention are described in the dependent claims.

According to another advantageous variant of a method according to the invention includes:

audio signals and possibly other signals, in particular PTT and SQU signals, input on a subscriber unit to be transmitted to at least one other subscriber unit via the second transmission chain, a check to be performed to ascertain whether the audio signals and possibly other signals input on the subscriber unit are transmitted via the wideband transmission path of the second transmission chain, and if the input audio signals and possibly other signals fail to be transmitted via the wideband transmission path of the second transmission chain, a switch to be made from the wideband transmission path of the second transmission chain to the wideband transmission interlink for transmitting audio signals and possibly other signals from the first transmission chain, and for audio signals and possibly other signals to be transmitted from the first transmission chain.

To permit a particularly flexible change for each individual audio signal between the transmission chains, a communication system according to the invention may provide for:

the error detection unit of the first transmission chain to be designed to check, following the switch from the wideband transmission path of the first transmission chain to the wideband transmission interlink for transmitting, in particular individual, audio signals and possibly other signals, in particular PTT and SQU signals, from the second transmission chain, whether the wideband transmission path of the first transmission chain (A) is again used to transmit audio signals and possibly other signals input on a subscriber unit, and if input audio signals and possibly other signals are transmitted via the wideband transmission path of the first transmission chain, to trigger the switching unit of the first transmission chain to switch from the wideband transmission interlink for transmitting audio signals and possibly other signals from the second transmission chain to the wideband transmission path (3A) of the first transmission chain; and for the error detection unit of the second transmission chain to be designed to check, following the switch from the wideband transmission path of the second transmission chain to the wideband transmission interlink for transmitting, in particular individual, audio signals and possibly other signals, in particular PTT and SQU signals, from the first transmission chain, whether the wideband transmission path of the second transmission chain is again used to transmit audio signals and possibly other signals input on a subscriber unit, and if input audio signals and possibly other signals are transmitted via the wideband transmission path of the second transmission chain, to trigger the switching unit of the second transmission chain to switch from the wideband transmission interlink for transmitting audio signals and possibly other signals from the first transmission chain to the wideband transmission path of the second transmission chain.

In this context, a method according to the invention may provide for:

following the switch from the wideband transmission path of the first transmission chain to the wideband transmission interlink for transmitting audio signals and possibly other signals, in particular PTT and SQU signals, from the second transmission chain, a check to be performed to ascertain whether the wideband transmission path of the first transmission chain is again used to transmit audio signals and possibly other signals input on a subscriber unit, and if input audio signals and possibly other signals are transmitted via the wideband transmission path of the first transmission chain, a switch to be made from the wideband transmission interlink for transmitting audio signals and possibly other signals from the second transmission chain to the wideband transmission path of the first transmission chain; and/or following the switch from the wideband transmission path of the second transmission chain to the wideband transmission interlink for transmitting audio signals and possibly other signals, in particular PTT and SQU signals, from the first transmission chain (A), a check to be performed to ascertain whether the wideband transmission path of the second transmission chain is again used to transmit audio signals and possibly other signals input on a subscriber unit, and if input audio signals and possibly other signals are transmitted via the wideband transmission path of the second transmission chain, a switch to be made from the wideband transmission interlink for transmitting audio signals and possibly other signals from the first transmission chain to the wideband transmission path of the second transmission chain.

According to an advantageous variant of a communication system according to the invention may provide for at least one subscriber-attributed processing unit and/or at least one additional processing unit of the first transmission chain and at least one subscriber-attributed processing unit and/or at least one additional processing unit of the second transmission chain to be connected to one another via a first wideband transmission interlink and a second wideband transmission interlink, wherein:

the first wideband transmission interlink can be used to forward audio signals and possibly other signals, in particular PTT and SQU signals, from the first transmission chain to the second transmission chain, and the second wideband transmission interlink can be used to forward audio signals and possibly other signals, in particular PTT and SQU signals, from the second transmission chain to the first transmission chain.

To be able to use a communication system according to the invention to produce audio conferences particularly efficiently, the invention may include at least one transmission chain of the communication system, in particular both transmission chains, to have an additional processing unit, in particular for the computation of audio conferences, the additional processing unit having no connections to subscriber units in each case, and there being provided in particular for:

the additional processing unit to have at least one wideband transmission interlink; and the subscriber-attributed processing unit of a respective transmission chain to be connected to the additional processing unit in each case.

To be able, for example, to also inform the subscribers who input audio signals on the subscriber units about a transmission chain being faulty, so that the subscribers can deliberately deliver signals to a different transmission chain, the invention may include:

the error detection unit to be designed in each case to transmit error information to the at least one subscriber-attributed processing unit, having a wideband transmission interlink, of the respective audio transmission chain and/or to the at least one additional processing unit, having a wideband transmission interlink, of the respective other transmission chain if the input audio signals and possibly other signals, in particular PTT and SQU signals, fail to be transmitted via the respective transmission chain; or error information to be transmitted to the subscriber unit used to input audio signals and possibly other signals and/or to the at least one other subscriber unit if the input audio signals and possibly other signals, in particular PTT and SQU signals, fail to be transmitted via the wideband transmission path of the respective transmission chain.

To be able to use the available bandwidth or the available transmission capacities as well as possible, there may be included:

a first wideband transmission interlink and/or a second wideband transmission interlink to each be able to be used to transmit, all of the audio signals of the respective wideband transmission path, and/or selected audio signals of the respective wideband transmission path, a communication protocol to be stored in the respective additional processing unit in order to select the audio signals to be transmitted, or the first wideband transmission interlink and/or the second wideband transmission interlink to each be used to transmit, all of the audio signals of the respective wideband transmission path; and/or selected audio signals of the respective wideband transmission path, there being in particular a predefined communication protocol to be used to select the audio signals to be transmitted.

According to an advantageous variant of a communication system according to the invention, which provides particularly large bandwidths of signals, there may be included at least one wideband transmission interlink, the first wideband transmission interlink, the second wideband transmission interlink, the wideband transmission path of the first transmission chain and/or the wideband transmission path of the second transmission chain to each be in the form of a PCM highway.

Other features which are considered as characteristic for the invention are set forth in the appended claims.

Although the invention is illustrated and described herein as embodied in a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
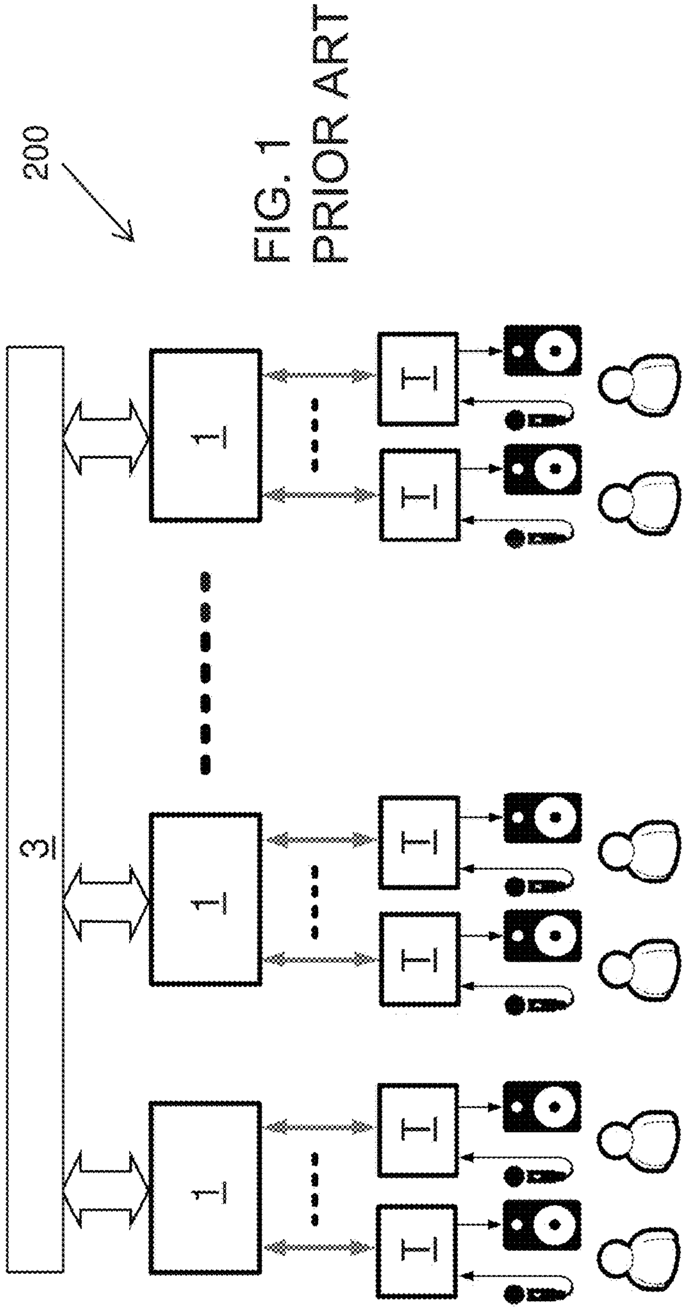
FIG. 1 PRIOR ART
FIG. 1 shows a first exemplary embodiment of a known nonredundant communication system.

FIG. 1 shows a first exemplary embodiment of a known nonredundant communication system 200 consisting of multiple processing units 1, which represent a two-stage audio transmission chain, the individual processing units 1 being connected to one another via a wideband transmission path, i.e. a wideband transmission medium 3, e.g. a PCM highway.

The individual subscriber units T are typically connected to the processing units 1 via connections with lower bandwidth, multiple subscriber units T being able to be connected to one processing unit 2.

Each subscriber unit T is usually equipped with at least a microphone for inputting audio signals to be transmitted and at least one loudspeaker or headset for delivering received audio signals. Additionally, operator control units for activating signalling, e.g. a PTT key, or for indicating signal reception may also be connected.

Figure 2:
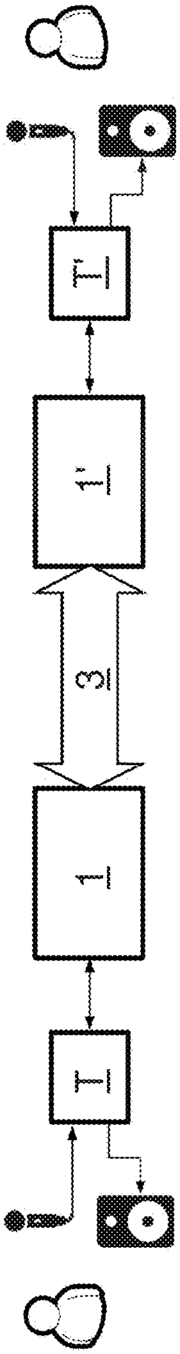
FIG. 2 PRIOR ART
FIG. 2 shows the transmission chain for audio signals between two subscribers in the exemplary embodiment in FIG. 1.

For the purpose of transmitting a microphone signal from a subscriber unit T to the loudspeaker or headset of another subscriber unit T', a transmission chain is obtained for the audio signals in accordance with FIG. 2. Audio signals that are input on a subscriber unit T via the microphone are initially transmitted to the connected processing unit 1 and onward from the processing unit 1 via the wideband transmission medium 3 to another processing unit 1'. This other processing unit 1' finally transmits the audio signals, including associated signalling, such as PTT or SQU signals, to the other subscriber unit T', where the audio signals are output via the loudspeaker or headset. A microphone signal is transmitted from the subscriber unit T' to the loudspeaker or headset of another subscriber unit T in the opposite direction.

Figure 3:
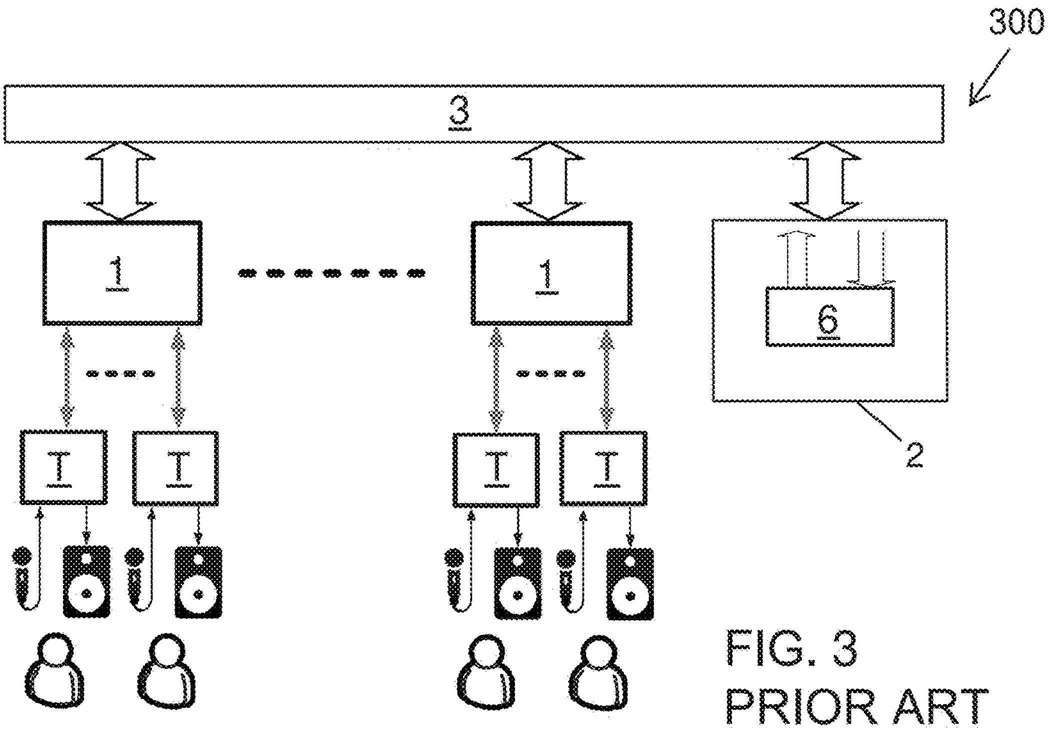
FIG. 3 PRIOR ART
FIG. 3 shows a second exemplary embodiment of a known communication system having an extra processing unit to which no subscribers are connected.

FIG. 3 shows, by way of example, an exemplary embodiment of another known communication system 300, which basically has the same design as the known communication system 200 in FIG. 1 but additionally has an additional processing unit 2, e.g. a conference unit, to which no subscriber units T are connected and which can be used for manipulating the audio signals, e.g. for conference computation. These signals are then again transmitted via the wideband transmission medium 3 to another processing unit 1' and then to the subscriber units T'.

In order to increase the availability of the transmission of signals and the functions of a communication system, it is quite generally possible to select different approaches to a solution so that errors in the communication system do not or only slightly affect the function thereof or the transmission of signals.

One option is to realize (multiple) redundant transmission chains or transmission paths, as are also disclosed in JP 2013126164 A in a system for transmitting e.g. control commands to individual, coupled wagons of a rail vehicle, for example in order to instigate the opening and closing of doors.

Figure 4:
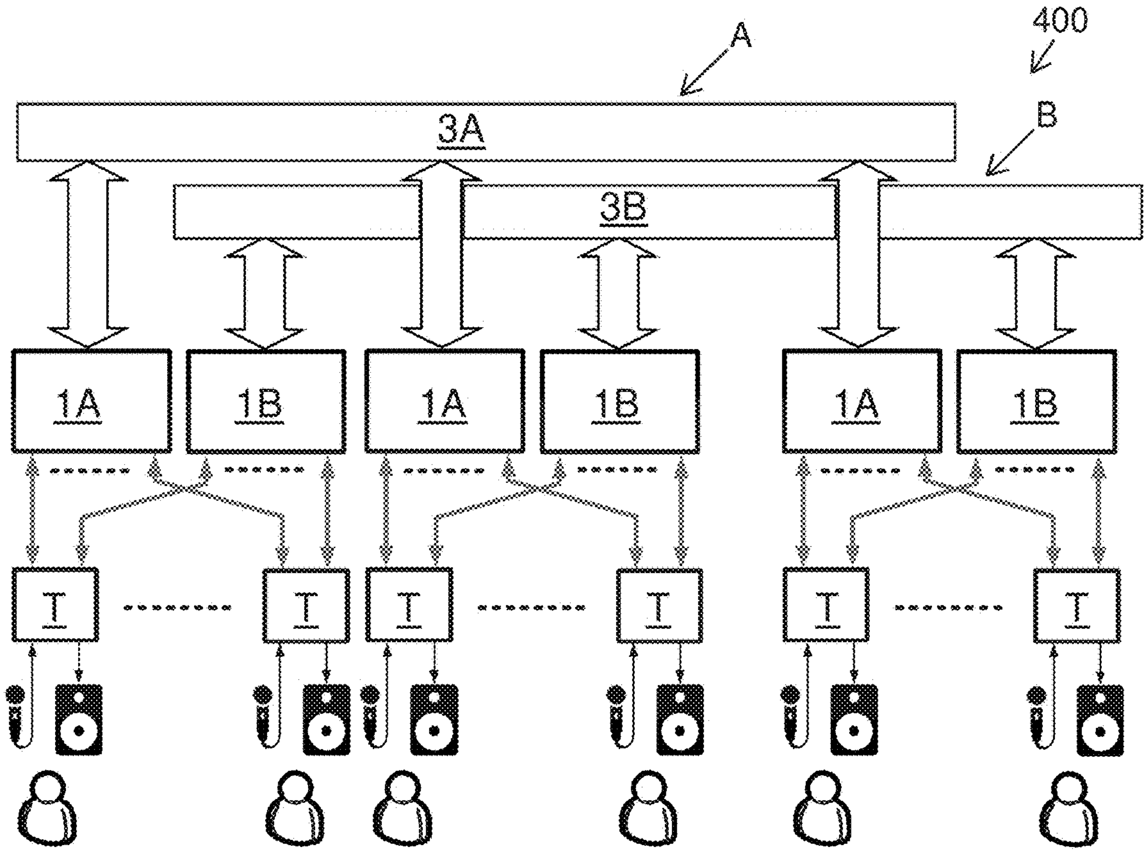
FIG. 4 PRIOR ART
FIG. 4 shows a third exemplary embodiment of a known communication system that is of redundant design.

FIG. 4 shows a third exemplary embodiment of a known communication system 400 that is realized in accordance with the communication system 200 in FIG. 1, but as a redundantly designed communication system having two transmission chains A, B. The communication system 400 is therefore of redundant design internally.

Each subscriber unit T transmits its microphone signal in both transmission chains A, B, and the processing of the audio signals, including associated signalling, such as PTT or SQU signals, takes place in both transmission chains A, B in parallel in the same way, as a result of which the two transmission chains A, B supply identical audio signals to the receiving subscriber units T. In this implementation the subscriber unit T selects one of the two audio signals for delivery to the subscriber. To this end, the subscriber units T have a switching unit, as shown in FIG. 5.

Figure 5:
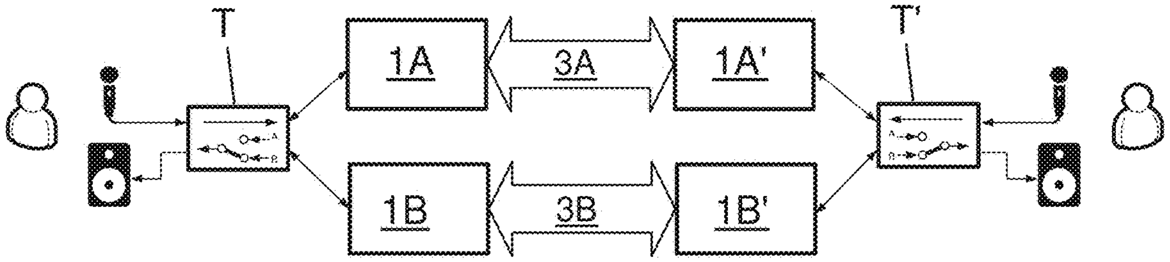
FIG. 5 PRIOR ART
FIG. 5 shows the transmission chain for audio signals between two subscribers in the exemplary embodiment in FIG. 4.

FIG. 5 shows the redundant transmission chains A, B between two communication partners, or subscribers, in the exemplary embodiment from FIG. 4. A subscriber unit T is used to initially transmit audio signals input via the microphone to the connected processing units 1A, 1B in parallel and onward from the processing units 1A, 1B via the respective wideband transmission medium 3A, 3B to the processing unit 1A', 1B' to which the receiving subscriber T' is connected. This other processing unit 1A', 1B' finally transmits the audio signals, including associated signalling, such as PTT or SQU signals, to the other subscriber unit T', where the audio signals are output via the loudspeaker or headset. A microphone signal is transmitted from the subscriber unit T' to the loudspeaker or headset of another subscriber unit T in the opposite direction.

Suitable measures for the received audio signals, including associated signalling, such as PTT or SQU signals, need to be implemented in the subscriber units T in order to be able to make an appropriate selection from the audio signals of the redundant transmission chain A, B.

Typically, only the audio signal of a transmission chain A, B is selected for output to the subscriber. Other implementations may also be realized, however, for example summing the audio signals of all transmission chains A, B.

If an error occurs in a processing unit 1 or a connection between a processing unit 1 and the subscriber unit T is faulty, the receiving subscriber unit T' must decide which audio signal is meant to be output to the user.

This requires the receiving subscriber unit T' to be informed of this error and to switch to the respective other transmission chain, which is not affected by the error. This results in an interruption to the audio signal in the receiving subscriber unit T', the duration of this outage being dependent on

- the time for the outage to be detected by a processing unit in the transmission chain,
- the time for transmitting this information from this processing unit to the receiving subscriber unit T',
- the time for the decision to switch in the receiving subscriber unit T' and
- the actual switching time in the receiving subscriber unit T'.

In the known communication systems, the switch is made in the receiving subscriber units T'. In this implementation the decision as to which of the audio signals of the redundant transmission chains A, B is used as the output signal from a subscriber unit T' is made autonomously in each receiving subscriber unit T'. This requires the error states of all components of all of the transmission chains A, B and the associated connections to be known to the receiving subscriber unit T'.

In realizing this approach in practice, the transmission of error states to the receiving subscriber units T' can lead to a problem, as the connections from the subscriber units T' to the processing units 1 are made with lower bandwidth.

Ultimately, only the receiving subscriber unit T' can decide whether it is affected by an error in a transmission chain. In the event of an error in a processing unit 1 or an error in a connection in a transmission chain, the receiving subscriber unit T' must check whether the selected audio signal is affected by this error, or whether a switch to the audio signal of the respective other transmission chain needs to be initiated.

Figure 6:
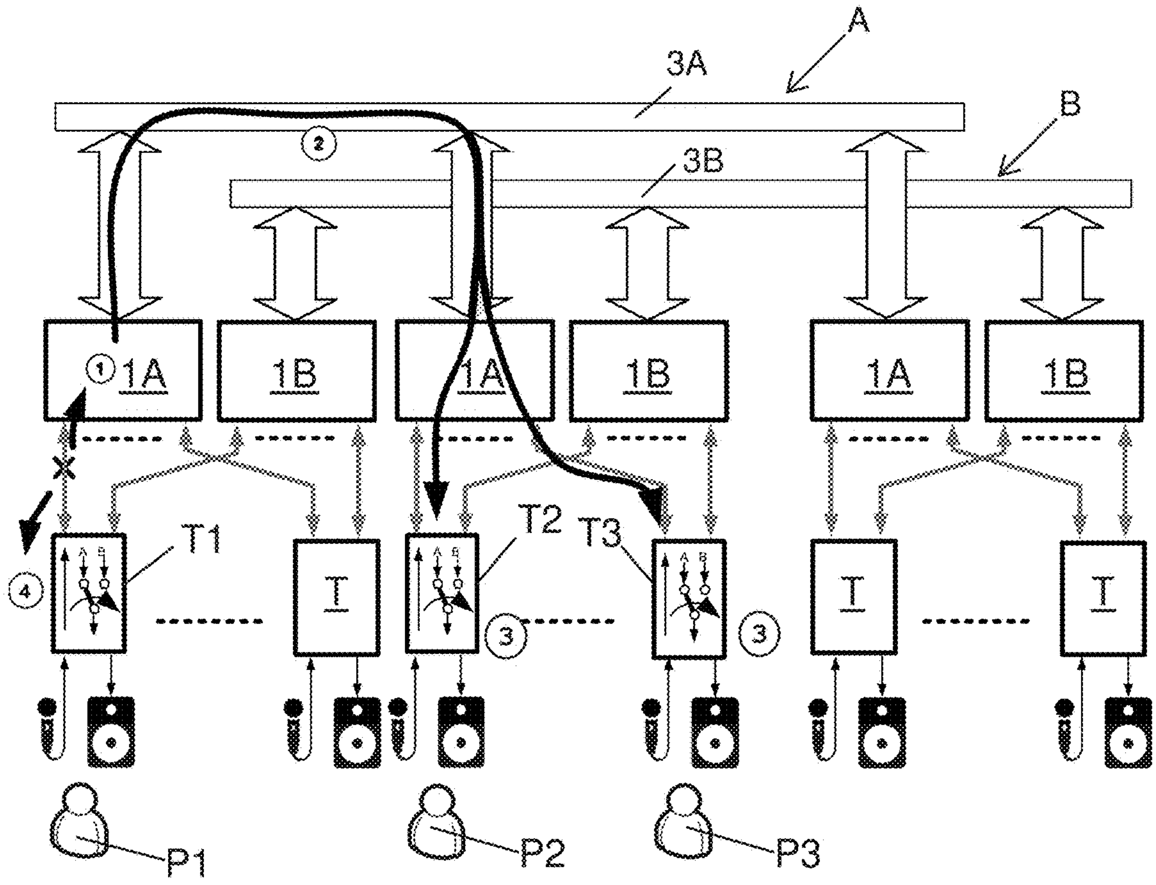
FIG. 6 shows the selection of the output signal at the receiving subscriber unit in the redundantly designed communication system with a two-stage audio transmission chain from FIG. 4.

In this context FIG. 6 shows an exemplary embodiment of communication between the subscriber P1 and subscriber P2, or subscriber P3, using the communication system 400 from FIG. 4.

Subscriber P1, subscriber P2 and subscriber P3 each have a subscriber unit T1, T2, T3, respectively, each of which is connected to a processing unit 1A of the first transmission chain A and to a processing unit 1B of the second transmission chain B. A first wideband transmission path 3A connects the processing units 1A of the first transmission chain A to one another, and the processing units 1B of the second transmission chain B are connected to one another via a second wideband transmission path 3B.

That is to say that if the subscriber P1 inputs an audio signal, e.g. delivers a radiotelephone message via the microphone on the subscriber unit T1, this audio signal is transmitted via each of the processing unit 1A, 1B and the wideband transmission path 3A, 3B to the processing unit 1A, 1B to which the subscriber P2 is connected by their subscriber unit T2 and the subscriber P3 is connected by their subscriber unit T3. The subscriber P2 and the subscriber P3 select the audio signal either from the transmission chain A or from the transmission chain B; in the exemplary embodiment shown, this would be e.g. the signal from the transmission chain A.

In the event of an error, the steps hereinbelow need to be performed. By way of explanation, an error is assumed in the connection to the processing unit 1A of the transmission chain A, which is connected to the subscriber unit T1 of the subscriber P1. Due to a fault in the connected processing unit 1A, the audio signals input on the subscriber unit T1 of the subscriber P1 cannot be transmitted to said processing unit, as indicated by a cut "x" on the relevant audio signal in FIG. 6.

The numbers indicated for the individual steps are indicated for the applicable elements in FIG. 6. FIG. 6 shows the transmission of the error information and the associated steps.

(1) Error detection in the affected processing unit 1A of the transmission chain A (e.g. on the basis of internal error messages).

(2) Distribution of the error information to all other elements or components of the affected transmission chain A, including the subscriber units T2, T3.

(3) As error information relating to the affected processing unit 1A has been distributed to the components of the transmission chain A, every component that is able to make a decision for selecting the audio signal, i.e. every receiving processing unit T of a receiving subscriber—in the exemplary embodiment these are the processing units T2 and T3 of the subscribers P2 and P3—must now check whether the receiving subscriber unit T is affected by the error in the transmission chain A, and the output signal from the other redundant transmission chain B must be selected if necessary.

(4) The error is also detected in the affected subscriber unit T1 of the subscriber P1, however, and a switch for the received audio signals in the subscriber unit T1 of the subscriber P1 to the other transmission chain B is made independently.

Disadvantages of such an implementation are:

In order to be able to keep the time for which the audio output signal is lost for a receiving subscriber in the event of an error state in the transmission chain as short as possible, there is a need for a fast transmission mechanism for the error information, or status information, between all components of a transmission chain;

In the event of multiple, different error states in the redundant transmission chains, it may sometimes not be possible to compensate for all of the error states in this arrangement merely by way of a switch; and In communication systems having an extra processing unit for the computation of audio conferences with multiple participants, the conference units may deliver different conference signals if there are different errors in the redundant transmission chains. This means that a switch from the audio signal of one transmission chain to the signal of the other transmission chain in a subscriber unit T can result in other participants being absent from the conference signal.

A method for transmitting audio signals according to the invention, or a communication system according to the invention, can be used in particular for, or as, voice communication systems for safety-critical applications and thereby increase the availability of the functions of the communication system in the event of an error. These systems may be for example voice communication systems for civil air traffic control, in which a multiplicity of air traffic controllers use different radio channels having different frequencies to communicate with the aircraft pilots, or communication systems where a very large number of operators as subscribers exchange information in individual audio conferences, as are used e.g. in the monitoring centers for manned space travel.

The design and operation of a communication system 100 according to the invention that overcomes the aforementioned problems when audio signals fail to be transmitted in a transmission chain are now explained below. The description is provided by way of example without restrictions on the basis of a communication system that has additional processing units 2A, 2B, to which no subscribers, or subscriber units, are connected and which are each equipped with at least one wideband transmission interlink, which will be discussed in more detail below. Such additional processing units 2A, 2B are optional, however, and it would also be possible, for example, for one or more subscriber-attributed processing units 1A, 1B in each transmission chain A, B to be equipped with at least one wideband transmission interlink.

Figure 7:
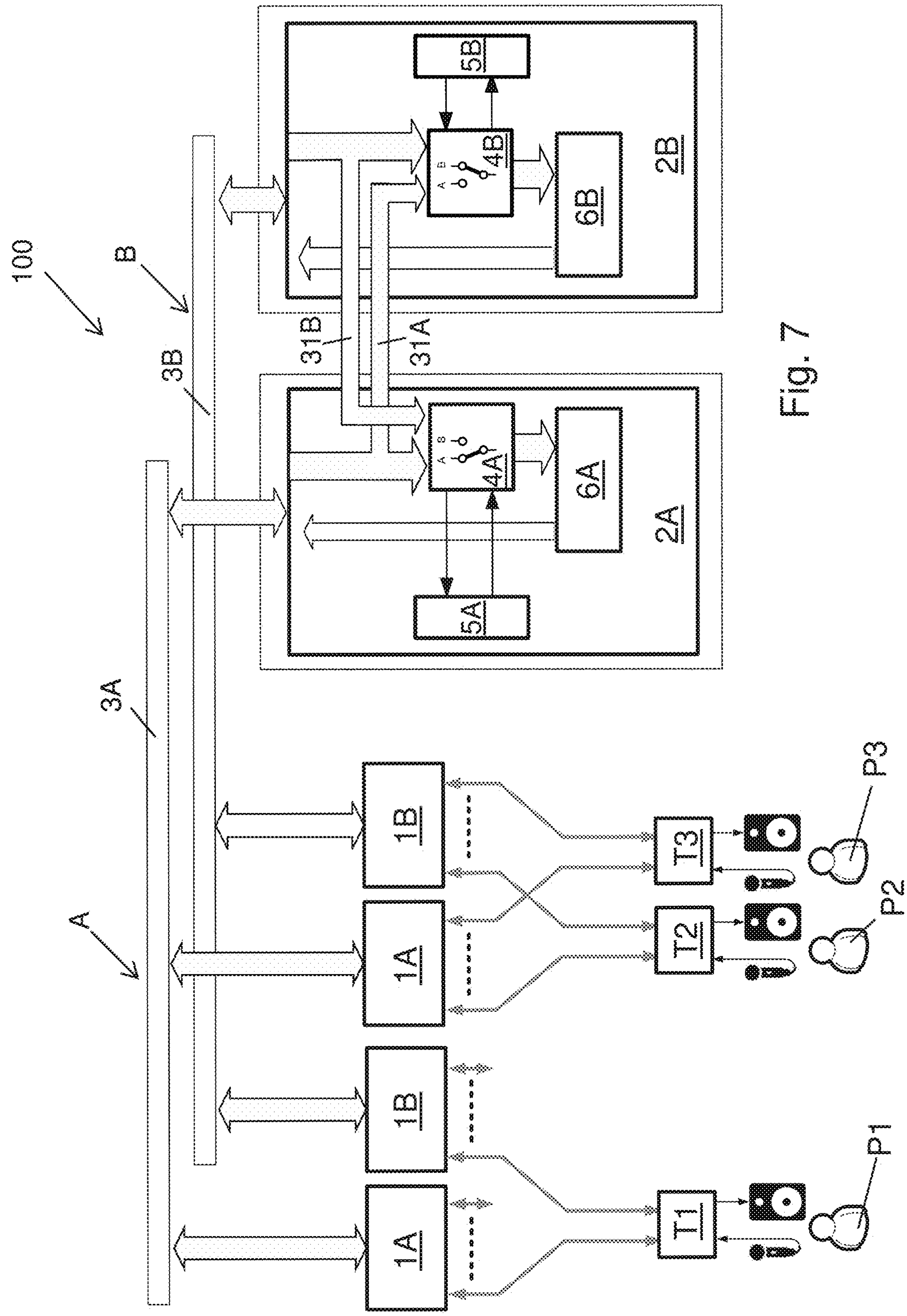
FIG. 7 shows an exemplary embodiment of a redundantly designed communication system according to the invention.

FIG. 7 shows a, redundantly designed, communication system 100 according to the invention that comprises a first transmission chain A and a second transmission chain B. It goes without saying that it may also comprise more than two transmission chains. FIG. 7 shows, by way of example, three subscribers P1, P2, P3, which are able to communicate with one another using an audio conference. It goes without saying that there may also be more or fewer subscribers.

Each transmission chain A, B in the exemplary embodiment comprises two subscriber-attributed processing units 1A, 1B and an additional processing unit 2A, 2B, in which e.g. audio conferences can be computed. The subscriber-attributed processing units 1A, 1B and the additional processing units 2A, 2B each have an audio processing unit 6. The subscriber-attributed processing units 1A, 1B have three subscriber units T1, T2, T3 of three subscribers P1, P2, P3 connected to them, for example via a transmission medium with low bandwidth. Each subscriber unit T1, T2, T3 in the exemplary embodiment comprises a microphone for inputting audio signals that are to be transmitted and a loudspeaker or headset for delivering received audio signals.

Alternatively or additionally, a subscriber unit T1, T2, T3 may also be in the form of an interface to a telephone line or to a radio (transmitter/receiver), however.

Each subscriber-attributed processing unit 1A, 1B is connected to at least one or more subscriber units in each case and each subscriber unit T1, T2, T3 is connected to a subscriber-attributed processing unit 1A of the first transmission chain A and to a subscriber-attributed processing unit 1B of the second transmission chain B in each case.

The signal transmission between the subscriber-attributed processing unit 1A, 1B and the additional processing unit 2A, 2B within the transmission chains A, B is realized via a wideband transmission path 3A, 3B. In the exemplary embodiment, this wideband transmission path 3A, 3B is a PCM highway in each case.

Additionally, in a communication system 100 according to the invention, the additional processing units 2A, 2B of the transmission chains A, B are connected to one another via wideband transmission interlinks 31A, 31B. In the exemplary embodiment, these are wideband interlinks that can be used to transmit the whole PCM highway of the respective transmission chain to the respective other transmission chain. Alternatively, there may also be included an individual bidirectional wideband transmission interlink. The first wideband transmission interlink 31A is used to forward audio signals from the first transmission chain A to the second transmission chain B, and the second wideband transmission interlink 31B is used to forward audio signals from the second transmission chain B to the first transmission chain A.

Additionally, error detection units 5A, 5B in the additional processing units 2A, 2B detect any error states for individual signals or for signal components, i.e. including absent PTT or SQU signals, on the wideband transmission path 3A, 3B, i.e. the respective PCM highway, to which the subscriber-attributed processing units 1A, 1B are connected.

Absent signals can be detected indirectly, for example, based on the error states of the connected subscriber-attributed processing units 1A, 1B, the status information needing to be transmitted only between the subscriber-attributed processing unit and the additional processing unit within a transmission chain A, B via the wideband transmission path and not to the subscriber units T1, T2, T3.

In the exemplary embodiment, the additional processing units 2A, 2B select which transmission chain A, B, or which wideband transmission path 3A, 3B, is meant to be used to transmit signals input by a subscriber on a subscriber unit T1, T2, T3 to the subscriber-attributed processing units 1A, 1B of the receiving subscriber units, or subscribers.

To this end, the additional processing units 2A, 2B of the transmission chains A, B each have a switching unit 4A, 4B. The switching unit 4A is connected to the wideband transmission path 3A of the transmission chain A and to the second wideband transmission interlink 31B. The switching unit 4B is connected to the wideband transmission path 3B of the transmission chain B and to the first wideband transmission interlink 31A. The wideband transmission interlinks 31A, 31B ensure that, in the exemplary embodiment, each additional processing unit 2A, 2B has an alternative channel available for each audio signal, which channel is certain to supply an error-free audio signal in the event of switching. The processing of the audio signals, i.e. the creation of new audio data (e.g. audio signals from conferences) from the received stream of signals, takes place in the audio processing units 6A, 6B. Depending on the function of the communication system 100, the audio processing units 6A and 6B can be selection of the best radio signal (best signal selection) in the case of a communication system for air traffic control, for example, or computation of audio conferences in the case of a conference system.

The wideband transmission interlinks 31A are used to transmit all signals of the wideband transmission path 3A and the wideband transmission interlinks 31B are used to transmit all signals of the wideband transmission path 3B.

The switching unit 4A can thus switch, for each individual signal, between the wideband transmission path 3A of the transmission chain A and the wideband transmission interlink 31B for transmitting signals from the respective other transmission chain B. The switching unit 4B can switch, for each individual signal, between the wideband transmission path 3B of the transmission chain B and the wideband transmission interlink 31A for transmitting signals from the respective other transmission chain A.

If for example the absence of signals is detected in the error detection unit 5A of the first transmission chain A, the applicable signals of the wideband transmission interlink 31B for the second transmission chain B are selectively forwarded to the receiving subscriber-attributed audio processing unit 6A, which sends the processed signals back to the subscriber-attributed processing units 1A.

This allows signals that are absent from the wideband transmission path to be replaced in individual subscriber-attributed processing units 1A by those on the wideband transmission interlink 31B, and therefore this error to be compensated for. Even if an error occurs, this reduces the outage times in which audio signals are absent for the subscriber units, specifically regardless of the function of the audio processing 6A in the additional processing unit 2A and in all other components of the transmission chain A. In the subscriber units T connected to the processing units 1A and 1B via connections with low bandwidth, a switch is made only when the transmission chain affected by the error has been selected for outputting audio signals.

Figure 8:
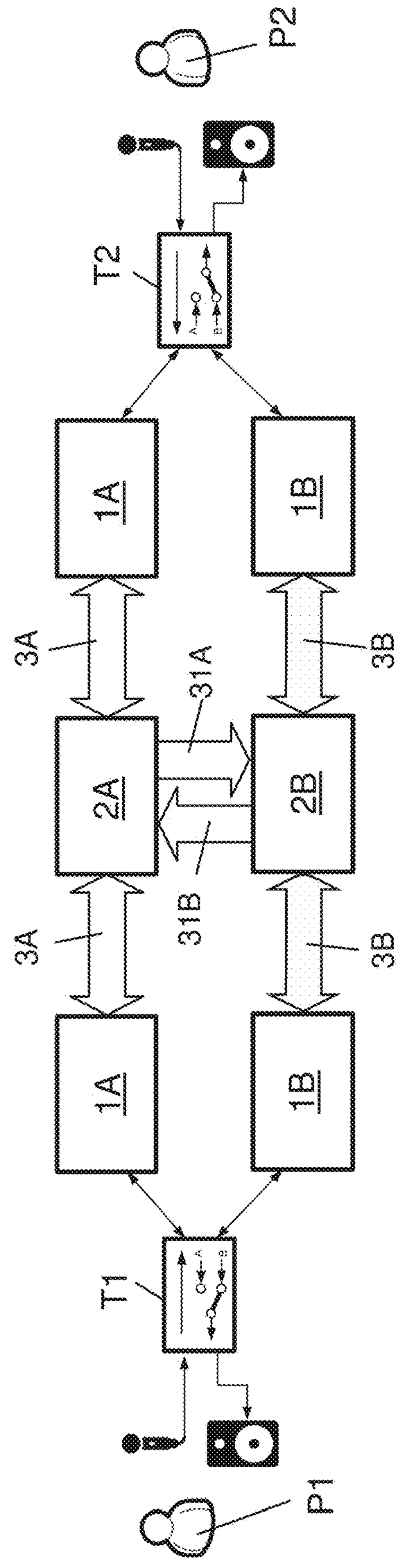
FIG. 8 shows the transmission chain for audio signals between two subscribers in the case of the exemplary embodiment according to the invention in FIG. 7.

FIG. 8 shows the transmission chains A, B of the communication system 100 according to the invention that is shown in FIG. 7 during a communication between the subscriber P1 and subscriber P2.

Subscriber P1 and subscriber P2 both have a subscriber unit T1, T2, respectively, each of which is connected to a subscriber-attributed processing unit 1A of the first transmission chain A and to a subscriber-attributed processing unit 1B of the second transmission chain B. A first wideband transmission path 3A connects each of the subscriber-attributed processing units 1A of the first transmission chain A to the additional processing unit 2A of the first transmission chain A, and the subscriber-attributed processing units 1B of the second transmission chain B are each connected to the additional processing unit 2B of the second transmission chain B via a second wideband transmission path 3B.

Additionally, the additional processing unit 2A of the first transmission chain A is connected to the additional processing unit 2B of the second transmission chain B via a first wideband transmission interlink 31A, which can be used to forward signals from the transmission chain A to the second transmission chain B. Furthermore, the additional processing unit 2B of the second transmission chain B is connected to the additional processing unit 2A of the second transmission chain A via a second wideband transmission interlink 31B, which can be used to forward signals from the transmission chain B to the first transmission chain A.

That is to say that if the subscriber P1 inputs an audio signal, e.g. delivers a radiotelephone message via the microphone on the subscriber unit T1, this signal is transmitted via each of the subscriber-attributed processing unit 1A, 1B and the wideband transmission path 3A, 3B to the subscriber-attributed processing unit 1A, 1B to which the subscriber P2 is connected by their subscriber unit T2.

The decisions as to whether audio signals are absent from the wideband transmission path 3A or 3B and the necessary switches are performed are made in the respective additional processing units 2A, 2B in the case of a communication system 100 according to the invention and not in the receiving subscriber unit T as in the case of the known communication systems 200, 300, 400 described above. This decision is made individually for each individual signal transmitted via the respective wideband transmission path 3A, 3B, or the respective PCM highway.

Figure 9:
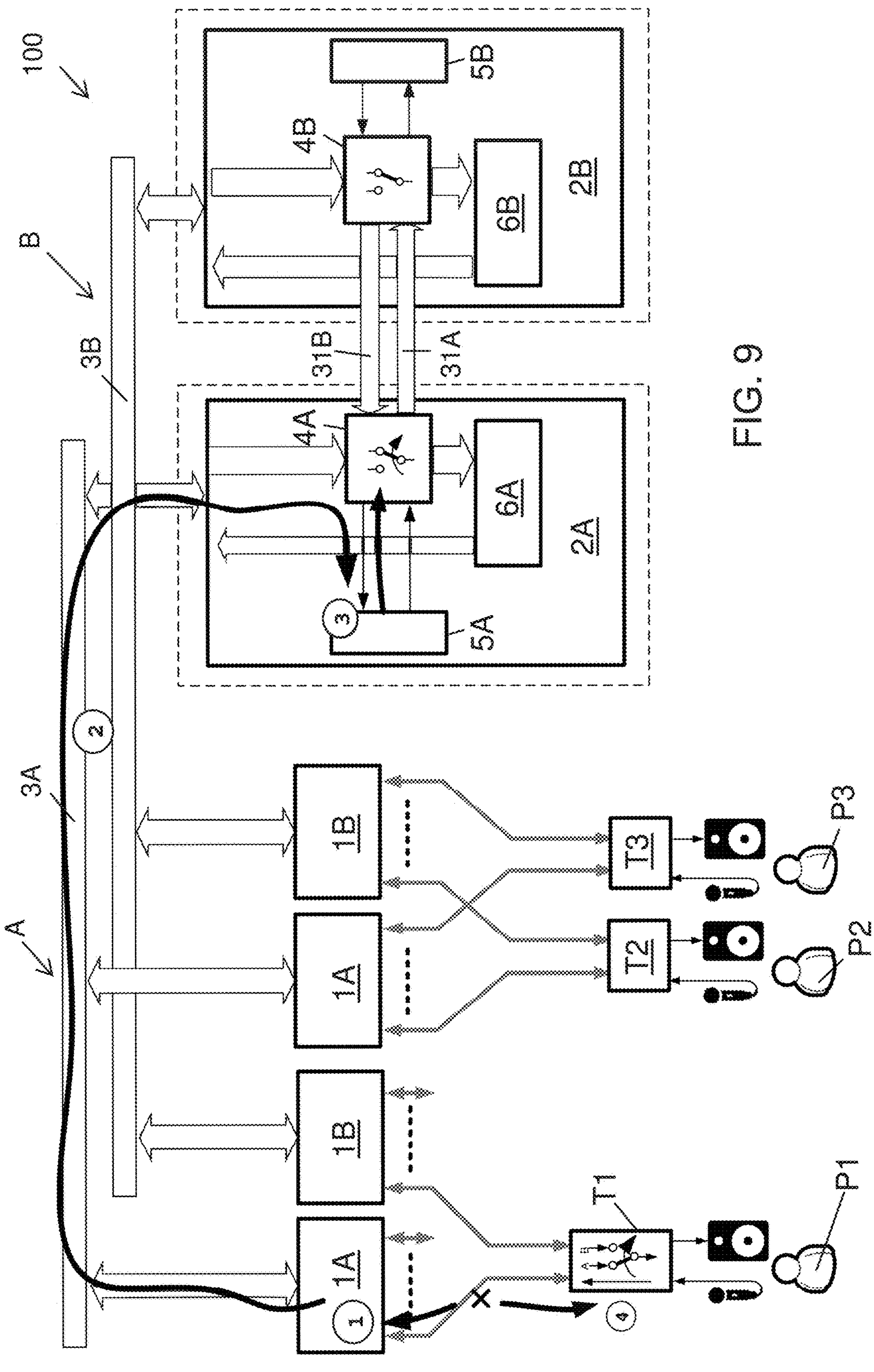
FIG. 9 shows the selection of the output signal at the receiving subscriber unit in the case of the communication system according to the invention from FIG. 7.

In this context FIG. 9 shows an exemplary embodiment of a communication between the subscriber P1 and subscribers P2, P3 using the communication system 100 according to the invention from FIG. 7.

Subscriber P1, subscriber P2 and subscriber P3 each have a subscriber unit T1, T2, T3, respectively, each of which is connected to a subscriber-attributed processing unit 1A of the first transmission chain A and to a subscriber-attributed processing unit 1B of the second transmission chain B. A first wideband transmission path 3A connects each of the subscriber-attributed processing units 1A of the first transmission chain A to the additional processing unit 2A of the first transmission chain A, and the subscriber-attributed processing units 1B of the second transmission chain B are each connected to the additional processing unit 2B of the second transmission chain B via a second wideband transmission path 3B.

That is to say that if the subscriber P1 inputs an audio signal, e.g. delivers a radiotelephone message via the microphone on the subscriber unit T1, this audio signal is processed further and transmitted as a signal via each of the subscriber-attributed processing unit 1A, 1B and the wideband transmission path 3A, 3B to the additional processing unit 2A, 2B and then to the subscriber-attributed processing unit 1A, 1B to which the subscriber P2 is connected by their subscriber unit T2 and the subscriber P3 is connected by their subscriber unit T3.

In the event of an error, the steps hereinbelow are performed in the exemplary embodiment. By way of explanation, an error is assumed in the subscriber-attributed processing unit 1A of the transmission chain A, which is connected to the subscriber unit T1 of the subscriber P1. Due to a fault in the connected subscriber-attributed processing unit 1A, the audio signals input on the subscriber unit T1 of the subscriber P1 cannot be transmitted to said processing unit, as indicated by a cut "x" on the relevant audio signal in FIG. 9.

The numbers indicated for the individual steps are indicated for the applicable elements in FIG. 9. FIG. 9 shows the transmission of the error information and the associated steps.

(1) Error detection in the affected subscriber-attributed processing unit 1A of the transmission chain A and generation of corresponding error information, (2) Distribution of the error information to the additional processing unit 2A of the transmission chain A via the wideband transmission path 3A, processing of the information and error detection by the error detection unit 5A of the additional processing unit 2A.

(3) Triggering of the switching unit 4A of the additional processing unit 2A by the error detection unit 5A and switching by the switching unit 4A to receive the absent signals via the second wideband transmission interlink 31B, which connects the additional processing unit 2A to the additional processing unit 2B of the second transmission chain B and which is used to forward signals from the transmission chain B to the first transmission chain A. That is to say that if signals fail to be transmitted via the first transmission chain A then the signals of the second transmission chain B are automatically transmitted to the subscriber-attributed processing unit 1A connected to the subscriber unit T2 of the subscriber P2, without any actions or operations needing to be performed in the subscriber unit T2 or by the subscriber P2. This decision is made individually for each individual signal transmitted via the respective wideband transmission path 3A, 3B, or the respective PCM highway. Audio signals that are absent from the wideband transmission path 3A, 3B can thus be replaced by the signals of the respective other wideband transmission path 3B, 3A for the processing in the audio processing unit 6A, 6B.

(4) Independently of this, as in the exemplary embodiment shown in FIG. 9, the error in the subscriber-attributed processing unit 1A is also detected in the affected subscriber unit T1 of the subscriber P1 themselves, however, and a switch is made independently of this in the subscriber unit T1 to switch this subscriber unit to the second transmission chain B in order to be also able to receive audio signals that are delivered on the loudspeaker or headset.

A communication system 100 according to the invention thus advantageously requires no switch in the subscriber units T2, T3 of the subscribers P2, P3, because the absent signal is also available in the first transmission chain A, which is affected by the error, via the second wideband transmission interlink 31B, which connects the additional processing unit 2A to the additional processing unit 2B.

As the subscriber P1 also transmits audio signals input on the subscriber unit T1 via the subscriber-attributed processing unit 1B, to which the subscriber unit T1 is connected, and the wideband transmission path 3B, the subscriber P3, whose subscriber unit T3 is connected to a subscriber-attributed processing unit 1B that receives signals via the wideband transmission path 3B, has all signals that the subscriber P1 inputs available completely.

If the error state is corrected, a switch is made to, or back to, the signal transmitted via the wideband transmission path 3A, to which the subscriber-attributed processing unit 1A is connected. This can be accomplished firstly by virtue of an appropriate error status message being generated by the subscriber-attributed processing unit 1A and being transmitted via the wideband transmission path 3A to the additional processing unit 2A, where the error status message is processed by the error detection unit 5A and an appropriate control command is delivered to the switching unit 4A. Alternatively, it is also possible for the error detection unit 5A to continually check whether signals are transmitted via the wideband transmission path 3A and, should this be the case, to deliver a control command in order to switch to the wideband transmission path 3A to the switching unit 4A.

The switch between the signals of the redundant transmission chains A, B can be performed for each signal individually and autonomously in the additional processing units 2A, 2B equipped with a wideband transmission interlink 31A, 31B. If the bandwidth of the wideband transmission interlink 31A, 31B is large enough, all of the signals of a respective wideband transmission path 3A, 3B of the respective transmission chain A, B can be transmitted to the additional processing unit of the respective other transmission chain. Should the available bandwidth for transmitting all signals be too little, however, it is alternatively also possible for only the necessary signals to be transmitted on demand. This increases the length of time before the effects of an error are corrected, however, because an extra communication is necessary between the additional processing units 2A, 2B of the redundant transmission chains A, B.

The following further features are therefore obtained in the communication system of the present invention:

- Signals that are absent from the wideband transmission medium 3A, 3B can be compensated for within a transmission chain A, B by replacing these signals with the signals of the respective other transmission chain A, B. Error propagation as a result of absent audio signals can be reduced in this way;
- Reduction of the time for which an output signal is lost for the subscriber units T in the event of an error, because the error is detected within the transmission chains A, B and the switching actions to compensate for the absence of audio signals are also performed there; and
- The selection and switching decisions are made independently of the application program in the additional processing units 2A, 2B, or optionally additionally in all or selected subscriber units T1, T2, T3.

Figure 10:
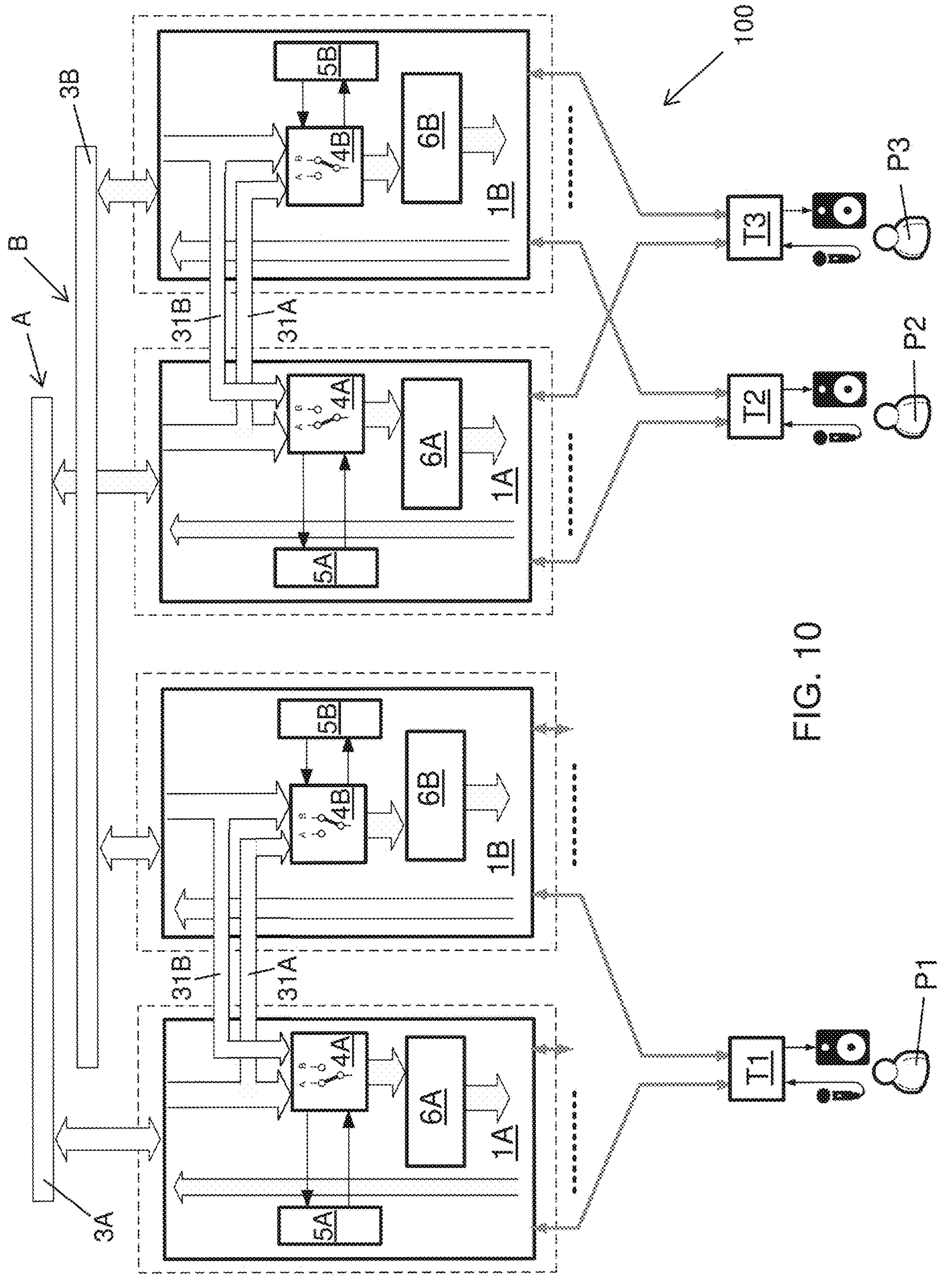
FIG. 10 shows another exemplary embodiment of a redundantly designed communication system according to the invention.

FIG. 10 shows another exemplary embodiment of a communication system 100 according to the invention, which, although it has a slightly different hardware design, corresponds, in terms of basic operation, to the operation described hereinabove.

In the exemplary embodiment in FIG. 10, the communication system 100 according to the invention has no additional processing units 2A, 2B with at least one wideband transmission interlink. Instead of additional processing units 2A, 2B, in the exemplary embodiment in FIG. 10 the subscriber-attributed processing units 1A of the first transmission chain A and two subscriber-attributed processing units 1B of the second transmission chain B are connected to one another via wideband transmission interlinks 31A, 31B, as have already been explained in connection with the exemplary embodiment described above, in each case. Alternatively, there may also be included a single bidirectional wideband transmission interlink. The first wideband transmission interlink 31A is used to forward audio signals from the first transmission chain A to the second transmission chain B and the second wideband transmission interlink 31B is used to forward audio signals from the second transmission chain B to the first transmission chain A.

The subscriber-attributed processing units 1A, 1B, which have a wideband transmission interlink 31A, 31B, also have error detection units 5A, 5B, and also switching units 4A, 4B, as have already been described hereinabove. The audio signals are processed, i.e. audio data are created from the received subscriber signals, as likewise described previously, in the audio processing units 6A, 6B, which are likewise accommodated in the subscriber-attributed processing units 1A, 1B.

The invention claimed is:

1. A communication system for transmitting signals between two or more subscriber units via at least a first transmission chain and a second transmission chain, the communication system comprising:

a plurality of subscriber units each of said plurality of subscriber units being configured to input signals to be transmitted and to output received signals;

at least a first and second transmission chain, each of said at least first and second transmission chain having at least one subscriber-attributed processing unit;

each of said at least one subscriber-attributed processing unit being connected to at least one of said plurality of subscriber units;

each of said plurality of subscriber units being connected to a subscriber-attributed processing unit of the first transmission chain and to a subscriber-attributed processing unit of the second transmission chain;

said subscriber-attributed processing units of a respective transmission chain being connected to one another via a wideband transmission path;

at least one subscriber-attributed processing unit of said first transmission chain and at least one subscriber-attributed processing unit of said second transmission chain being connected to one another via at least one wideband transmission interlink, said at least one wideband transmission interlink being configured to forward signals from said first transmission chain to said second transmission chain and/or from said second transmission chain to said first transmission chain, and said at least one subscriber-attributed processing unit having the wideband transmission interlink having:

a switching unit being connected to the wideband transmission path of the respective transmission chain and to the at least one wideband transmission interlink, and being configured to switch between the wideband transmission path of the respective transmission chain and the wideband transmission interlink for transmitting signals from the respective other transmission chain, an error detection unit being connected to the switching unit, the error detection unit of the first transmission chain being configured to check whether signals input on a subscriber unit are transmitted via the wideband transmission path of the first transmission chain, and to trigger the switching unit to switch from the wideband transmission path of the first transmission chain to the wideband transmission interlink for transmitting signals from the second transmission chain if the input signals fail to be transmitted via the wideband transmission path of the first transmission chain, and the error detection unit of the second transmission chain being configured to check whether signals input on a subscriber unit are transmitted via the wideband transmission path of the second transmission chain, and trigger the switching unit to switch from the wideband transmission path of the second transmission chain to the wideband transmission interlink for transmitting signals from the first transmission chain if the input signals fail to be transmitted via the wideband transmission path of the second transmission chain, and a processing unit being connected downstream of the switching unit, said processing unit being supplied with the signals selected by the switching unit.

2. The communication system according to claim 1, wherein:

the error detection unit of the first transmission chain is configured to check, following a switching from the wideband transmission path of the first transmission chain to the wideband transmission interlink for transmitting signals from the second transmission chain, whether the wideband transmission path of the first transmission chain is again used to transmit signals input on a subscriber unit, and if input signals are transmitted via the wideband transmission path of the first transmission chain, trigger the switching unit of the first transmission chain to switch from the wideband transmission interlink for transmitting signals from the second transmission chain to the wideband transmission path of the first transmission chain; and the error detection unit of the second transmission chain is configured to check, following a switching from the wideband transmission path of the second transmission chain to the wideband transmission interlink for transmitting signals from the first transmission chain, whether the wideband transmission path of the second transmission chain is again used to transmit signals input on a subscriber unit, and if input signals are transmitted via the wideband transmission path of the second transmission chain, trigger the switching unit of the second transmission chain to switch from the wideband transmission interlink for transmitting signals from the first transmission chain to the wideband transmission path of the second transmission chain.

3. The communication system according to claim 1, wherein:

at least one subscriber-attributed processing unit of the first transmission chain and at least one subscriber-attributed processing unit of the second transmission chain are connected to one another via a first wideband transmission interlink and a second wideband transmission interlink;

the first wideband transmission interlink is configured to forward signals from the first transmission chain to the second transmission chain; and the second wideband transmission interlink is configured to forward signals from the second transmission chain to the first transmission chain.

4. The communication system according to claim 1, wherein:

at least one of said transmission chains has an additional processing unit, the additional processing unit having no connections to said subscriber units;

the additional processing unit having at least one wideband transmission interlink; and the subscriber-attributed processing unit of a respective transmission chain being connected to the additional processing unit.

5. The communication system according to claim 4, wherein the error detection unit is configured to transmit error information to the at least one subscriber-attributed processing unit, having a wideband transmission interlink, of the respective transmission chain and/or to the at least one additional processing unit, having a wideband transmission interlink, of the respective other transmission chain if the input signals fail to be transmitted via the respective transmission chain.

6. The communication system according to claim 5, wherein:

the first wideband transmission interlink and/or the second wideband transmission interlink are configured to transmit all the signals of the respective wideband transmission path, and/or selected signals of the respective wideband transmission path; and a communication protocol stored in the respective additional processing unit is configured to select the signals to be transmitted.

7. The communication system according to claim 5, wherein the at least one wideband transmission interlink, the first wideband transmission interlink, the second wideband transmission interlink, the wideband transmission path of the first transmission chain and/or the wideband transmission path of the second transmission chain are in the form of a PCM highway.

8. The communication system according to claim 1, wherein the signals are audio signals, push-to-talk ("PTT") signals, and/or squelch ("SQU") signals.

9. The communication system according to claim 1, wherein each of said at least first and second transmission chain have at least one additional processing unit.

10. The communication system according to claim 9, wherein:

at least one subscriber-attributed processing unit and/or at least one additional processing unit of the first transmission chain and at least one subscriber-attributed processing unit and/or at least one additional processing unit of the second transmission chain are connected to one another via a first wideband transmission interlink and a second wideband transmission interlink;

the first wideband transmission interlink is configured to forward signals from the first transmission chain to the second transmission chain; and the second wideband transmission interlink is configured to forward signals from the second transmission chain to the first transmission chain.

11. A method for transmitting signals between two or more subscriber units via at least a first transmission chain and a second transmission chain, the method comprising:

providing a plurality of subscriber units configured to input signals to be transmitted to at least one other subscriber unit and to output signals received from the at least one other subscriber unit, and wherein signals within a respective transmission chain can be transmitted via a wideband transmission path, and signals can be transmitted between the first transmission chain and the second transmission chain via at least one wideband transmission interlink;

inputting signals on a subscriber unit for transmission via the first transmission chain and via the second transmission chain;

transmitting signals input on the subscriber unit to at least one other subscriber unit via the first transmission chain;

checking whether the signals input on the subscriber unit are transmitted via the wideband transmission path of the first transmission chain; and if the input signals fail to be transmitted via the wideband transmission path of the first transmission chain, switching from the wideband transmission path of the first transmission chain to the wideband transmission interlink for transmitting signals from the second transmission chain, and transmitting signals from the second transmission chain.

12. The method according to claim 11, further comprising:

following a switching from the wideband transmission path of the first transmission chain to the wideband transmission interlink for transmitting signals from the second transmission chain, checking whether the wideband transmission path of the first transmission chain is again used to transmit signals input on a subscriber unit; and if input signals are transmitted via the wideband transmission path of the first transmission chain, switching from the wideband transmission interlink for transmitting signals from the second transmission chain to the wideband transmission path of the first transmission chain.

13. The method according to claim 11, further comprising:

transmitting signals input on a subscriber unit to at least one other subscriber unit via the second transmission chain;

checking whether the signals input on the subscriber unit are transmitted via the wideband transmission path of the second transmission chain; and if the input signals fail to be transmitted via the wideband transmission path of the second transmission chain, switching from the wideband transmission path of the second transmission chain to the wideband transmission interlink for transmitting signals from the first transmission chain, and transmitting signals from the first transmission chain.

14. The method according to claim 13, further comprising:

following the switching from the wideband transmission path of the second transmission chain to the wideband transmission interlink for transmitting signals from the first transmission chain, checking whether the wideband transmission path of the second transmission chain is again used to transmit signals input on a subscriber unit; and if input signals are transmitted via the wideband transmission path of the second transmission chain, switching from the wideband transmission interlink for transmitting signals from the first transmission chain to the wideband transmission path of the second transmission chain.

15. The method according to claim 14, wherein error information is transmitted to the subscriber unit used to input signals and/or to the at least one other subscriber unit if the input signals fail to be transmitted via the wideband transmission path of the respective transmission chain.

16. The method according to claim 15, wherein a first wideband transmission interlink and/or a second wideband transmission interlink are each used to transmit all of the signals of the respective wideband transmission path and/or selected signals of the respective wideband transmission path, and a predefined communication protocol is configured to select the signals to be transmitted.

* * * * *